United States Patent [19]
Easter

[11] 3,818,758
[45] June 25, 1974

[54] ELECTRICAL FLOW METER
[75] Inventor: Edmond Easter, Hampton, Va.
[73] Assignee: Fluid Flow, Inc., Atlanta, Ga.
[22] Filed: Oct. 6, 1972
[21] Appl. No.: 295,479

[52] U.S. Cl. .................................................. 73/204
[51] Int. Cl. ............................ G01f 1/00, G01p 5/10
[58] Field of Search ........... 73/204; 323/75 H, 75 L, 323/75 N

[56] References Cited
UNITED STATES PATENTS

| | | | |
|---|---|---|---|
| 2,896,452 | 7/1959 | Cogniat et al. | 73/204 |
| 3,181,357 | 5/1965 | Benson | 73/204 |
| 3,246,523 | 4/1966 | Richard | 73/204 |
| 3,251,225 | 5/1966 | Luft | 73/204 |
| 3,433,068 | 3/1969 | Werner et al. | 73/204 |
| 3,435,676 | 4/1969 | Bruckner et al. | 73/204 |

FOREIGN PATENTS OR APPLICATIONS

| | | | |
|---|---|---|---|
| 601,298 | 11/1946 | Great Britain | 73/204 |
| 876,484 | 5/1953 | Germany | 73/204 |

*Primary Examiner*—Herbert Goldstein
*Attorney, Agent, or Firm*—Jacob Shuster

[57] ABSTRACT

Fluid flow rate determined by measuring the displacement of distributed electrical resistance along a flow conduit through which fluid is conducted. The flow conduit is heated by current simultaneously induced therein and in a fluid storing tube of the same structural and electrical configuration. The resistances of the flow conduit and the fluid storing tube form the resistive branches of a balanced bridge circuit through which changes in the resistance distribution are measured.

11 Claims, 6 Drawing Figures

ELECTRICAL FLOW METER

This invention relates to the measurement of fluid flow rate by electrical means.

A well known technique for measuring the flow of gases or liquids involves electrically heating a flow tube to obtain a certain temperature distribution that is displaced by changes in the flow rate of the fluid. This thermal displacement principle is disclosed for example in U.S. Pat. No. 2,946,220 to Cogniat, wherein the temperatures at two points along the flow tube are observed through electrical sensors to determine flow rate. The same flow measurement principle, utilizing a thermocouple circuit to sense changes in temperature at a fixed point, is disclosed in U.S. Pat. No. 3,181,357 to Benson. Such prior flow metering systems are inherently inaccurate because the temperature measurements rely on detection of temperatures at fixed points and by circuits having at least some portions external to the flow tube. Changes in electrical properties at fixed points and changes in ambient temperatures affecting external portions of the measuring circuits introduce errors that require complex and expensive equipment to correct or compensate.

It is therefore an important object of this invention to provide a flow measuring system of the thermal displacement type aforementioned, that is not subject to the measurement errors associated with prior art arrangements.

In accordance with the present invention, a pair of similar flow tubes made of electrically resistive material, form current conductors to produce heating between heat sink locations at a common ground potential on a flow regulating body to which the flow tubes are connected. One of the flow tubes conducts fluid at an unknown rate regulated by parallel flow through a restricted passage in the heat sink body while the other flow tube is blocked to store the same fluid under no-flow conditions. The average temperatures or resistances under no-flow conditions, are compared by means of a resistive bridge circuit to measure any thermal displacement of the temperature distribution along the flow tube conduit during fluid flow. The resistive branches of the bridge circuit are constituted only by the resistances of the flow tube and the fluid storing tube to the exclusion of any external resistances. In one embodiment, a differential amplifier is connected to the balanced potential junctures formed as taps on the flow and fluid storing tubes at points of one-half the electrical resistances thereof, in order to produce a larger output.

Figure 1:
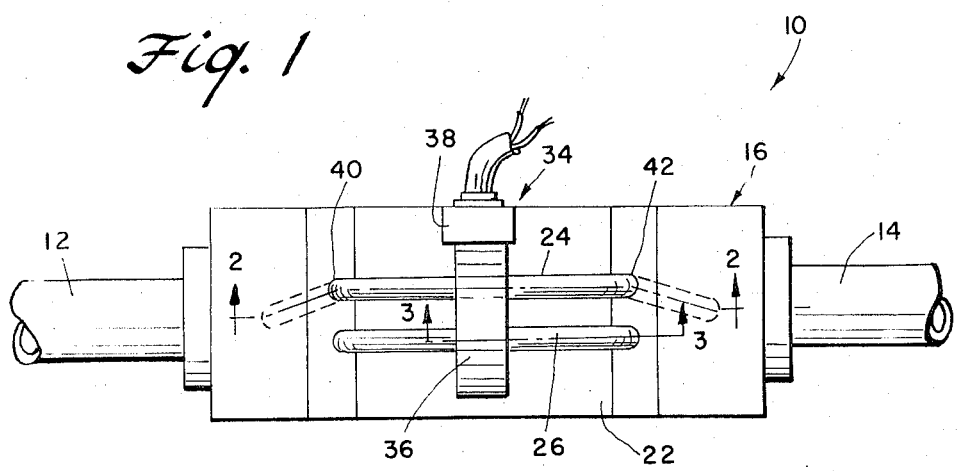
FIG. 1 is a top plan view of a flow rate measuring device constructed in accordance with the present invention.
Figure 2:
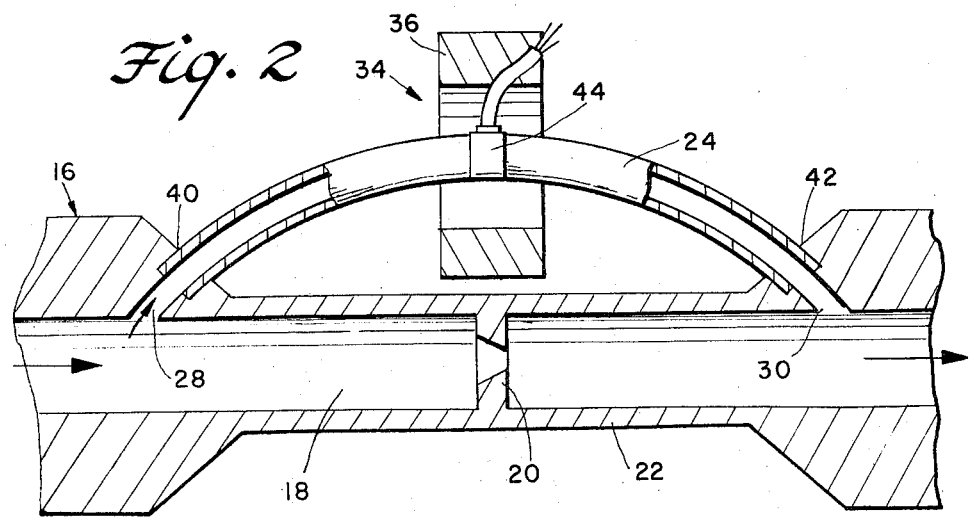
FIG. 2 is a partial side sectional view taken substantially through a plane indicated by section line 2—2 in FIG. 1.

Referring now to the drawings in detail, FIGS. 1 and 2 show a flow rate measuring device generally denoted by reference numeral 10. In the illustrated embodiment, the device 10 is positioned in the flow path extending from conduit section 12 to conduit section 14 interconnected by a flow regulating body of block 16. A flow passage 18 is formed in the block through which gas or other fluid may be conducted, the passage being provided with any suitable flow restriction, fixed or adjustable, such as the orifice plate 20 shown by way of example in FIG. 2. The block 16 may be electrically grounded to establish a common reference or ground potential and sufficiently massive to form a heat sink at ambient temperature.

Figure 3:
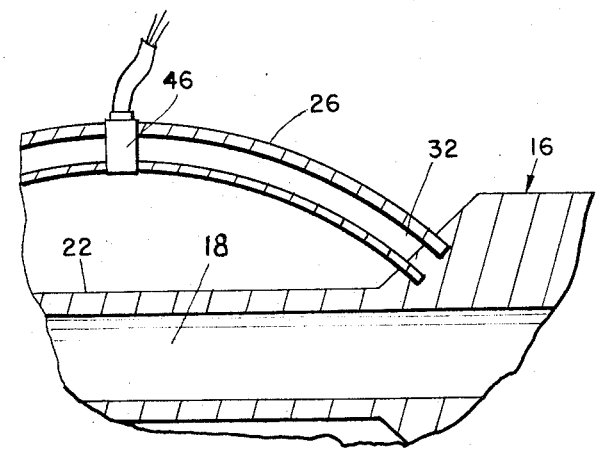
FIG. 3 is a partial sectional view taken substantially through a plane indicated by section line 3—3 in FIG. 1.

The block 16 is formed with a necked down portion 22 to accomodate a pair of small diameter tubes 24 and 26 both made of the same electrically conductive but resistive material, the resistance of which is affected by changes in temperature of the fluid contained therein. The tube 24 communicates at opposite ends with the passage 18 on opposite sides of the restriction 20 so as to conduct a parallel flow of the fluid regulated by flow through the restriction. While the tube 24 thus constitutes a parallel flow conduit, the tube 26 may be blocked at the downstream end 32 as shown in FIG. 3 so as to store the same fluid under no-flow conditions during flow of the fluid through the flow conduit tube 24.

Both tubes 24 and 26 are simultaneously heated by electrical heating means generally referred to by reference numeral 34. In the illustrated embodiment heating is effected inductively by a transformer including a toroid core 36 and a primary winding 38. The arcuate tubes 24 and 26 have identical loop configurations to form secondary windings of the transformer within which current is induced. The induced current will accordingly flow and heat the tubes above the ambient temperature of the body 16 between surface locations 40 and 42 on the body 16 from which the tubes project and at which locations the tubes are at the common ground potential of the body 16.

Figure 5:
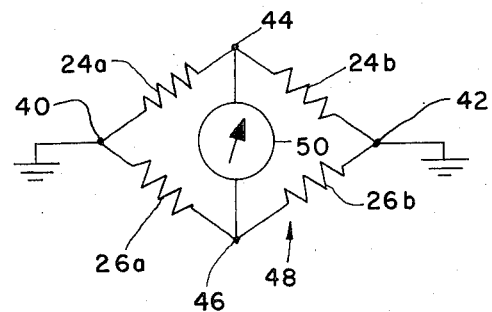
FIG. 5 is a resistance equivalent bridge circuit corresponding to the measuring portion of the circuit shown in FIG. 4.
Figure 6:
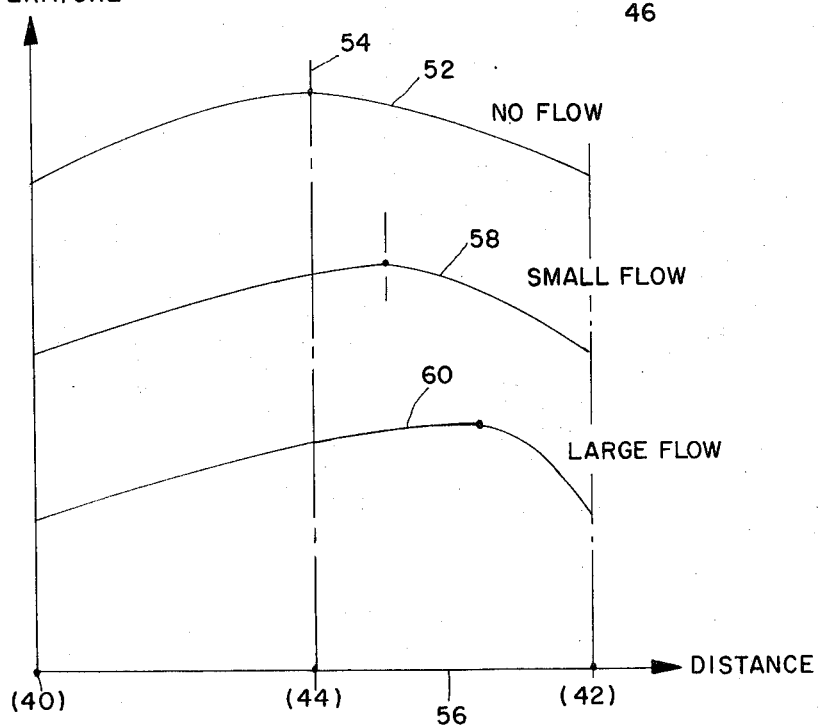
FIG. 6 is a graphical illustration depicting typical temperature or resistance distribution patters under different flow conditions.

Temperature or resistance measurements are made through leads connected by taps 44 and 46 to the tubes 24 and 26 at points of one-half the total electrical resistances under no-flow or zero flow conditions. Accordingly, the average temperatures or resistances of the tubes on opposite sides of the taps 44 and 46 are equal under no-flow conditions and in accordance with the present invention form the resistive branches of a balanced bridge circuit 48 as shown in FIG. 5. The resistive branches 24a and 24b on opposite sides of the balanced potential juncture 44 will vary relative to each other as a function of flow rate of fluid through the flow tube 24, while the resistive branches 26a and 26b will remain substantially equal to each other on opposite sides of juncture 46. Thus, the output of the meter section 50 connected between junctures 44 and 46 will reflect an amount of unbalance caused by a corresponding flow of fluid through flow tube 24, because of thermal displacement of the symmetrical resistance distribution pattern along the tubes as shown by the curves in FIG. 6. Curve 52 reflects the temperature distribution for both tubes 24 and 26 under no flow conditions. The center line of symmetry 54 thus intersects the distance coordinate 56 at a location corresponding to the bridge junctures 44 and 46 on the tubes. As is well known by those skilled in the art, there will be a displacement of temperature distribution during flow through tube 24 as shown by curves 58 and 60 in FIG. 6. This results in a difference in average temperature or resistance on opposite sides of juncture 44, dependent on the flow rate which is thereby measured by the bridge circuit through an appropriately calibrated meter section 50.

Figure 4:
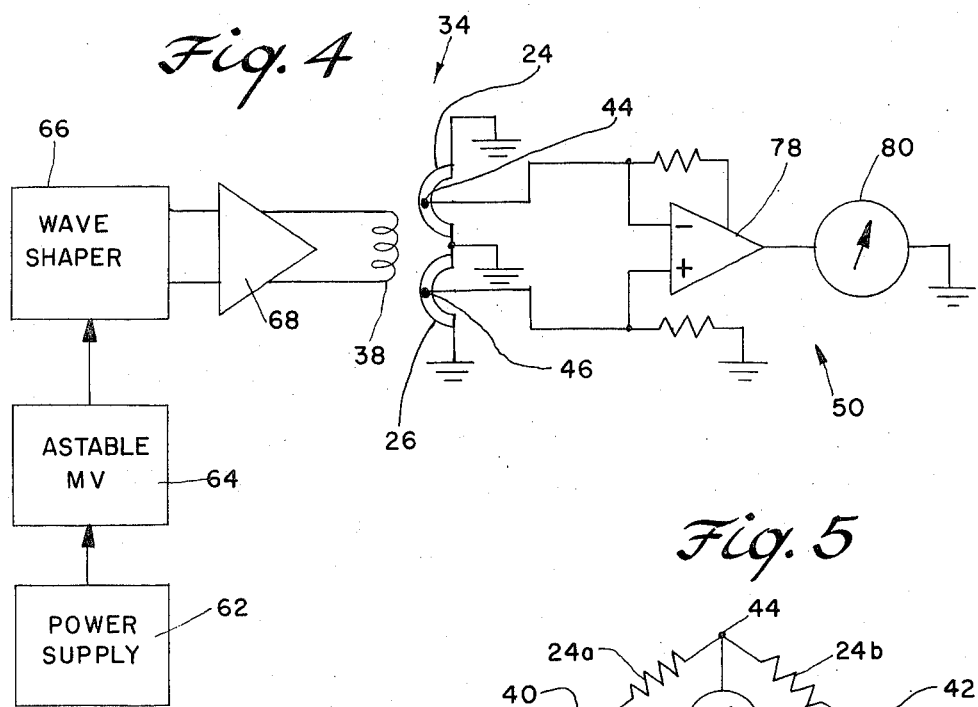
FIG. 4 is a simplified electrical circuit diagram of the flow measuring system associated with the device shown in FIGS. 1–3.

FIG. 4 schematically and symbolically illustrates a typical embodiment in which power for exciting the transformer through primary winding 38 originates from a power supply 62 operating a free running multivibrator 64 at 4 to 8 khz. The output frequency of multivibrator 64 is divided by four through a wave shaping circuit 66 and applied to a power amplifier 68 from which the primary winding 38 is energized.

The flow tube 24 forms the secondary winding of the transformer as shown in FIG. 4 as well as the variable resistance sections 24a and 24b on opposite sides of tap 44 as depicted in FIG. 5. Equal reference resistance sections 26a and 26b are similarly formed on opposite sides of tap 46 by the fluid storing tube 26 which also forms the secondary reference winding.

The meter section 50 may be formed by a differential amplifier 78 having its two inputs connected to the taps 44 and 46. The amplifier output is connected to a calibrated meter 80. The average resistance of the flow tube 24 as compared to that of the fluid storing tube is reflected by a difference between the inputs to the amplifier and produces an output that is readout as flow rate by the meter 80.

The system described is capable of making flow measurements within a significantly lower operating heating temperature range as compared to prior art systems aforementioned because of the relatively low resistance of the flow conduit material. Accordingly, measurement of flow is possible for liquids that would vaporize in the temperature range to which prior art systems are limited.

What is claimed is:

1. In a fluid flow metering apparatus, a flow conduit made of electrically conductive material having an electrical resistance that varies as a function of temperature, means for conducting a flow of fluid through said conduit between spaced locations of common electrical potential, electrical power means for producing a flow of electrical current through said material only between said locations to heat the flow conduit and vary the resistance between said locations and measuring means connected to the conduit at a single point intermediate said locations for establishing resistive branches of a bridge circuit between said locations to measure variations in distribution of the electrical resistance along the conduit during flow of fluid therethrough.

2. The combination of 1 wherein said single point divides the total electrical resistance of the conduit material between said locations in half to form said resistive branches during substantially zero flow of the fluid.

3. The combination of claim 2 including fluid storing means structurally and electrically similar to the conduit forming a reference resistance having a substantially symmetrical distribution pattern between said locations along the conduit, said measuring means being connected to the fluid storing means at a point of symmetry relative to said resistance distribution pattern.

4. The combination of claim 3 wherein said measuring means includes current metering means connected to the conduit and the fluid storing means at said points to form balanced potential junctures, the resistances of the conduit and the fluid storing means constituting the only resistive branches of the bridge circuit.

5. The combination of claim 4 wherein said electrical power means includes a transformer in which the conduit and the fluid storing means constitute secondary loop windings extending between said spaced locations within which said current is induced.

6. The combination of claim 1 including fluid storing means structurally and electrically similar to the conduit forming a reference resistance having a substantially symmetrical distribution pattern between said locations along the conduit, said measuring means to complete said bridge circuit being connected to the fluid storing means.

7. The combination of claim 6 wherein said measuring means includes current metering means connected to the conduit and the fluid storing means.

8. The combination of claim 7 wherein said electrical power means includes a transformer in which the conduit and the fluid storing means constitute secondary loop windings extending between said spaced locations within which said current is induced.

9. The combination of claim 6 wherein said electrical power means includes a transformer in which the conduit and the fluid storing means constitute secondary loop windings extending between said spaced locations within which said current is induced.

10. The combination of claim 1 wherein said means for conducting a flow of fluid comprises an electrically grounded heat sink body having a flow passage conducting said fluid in parallel relation to the fluid conducted through said flow conduit, said flow conduit being connected to and extending from said body at said spaced locations.

11. The combination of claim 10 including fluid storing means structurally and electrically similar to the flow conduit forming a reference resistance extending between said spaced locations on the body and to which the measuring means is connected to complete the bridge circuit, said electrical power means comprising a source of alternating current and primary winding means connected to said source and inductively coupled to said flow conduit and said fluid storing means for inducing a flow of current between said spaced locations of common potential.

* * * * *